Figure 1:
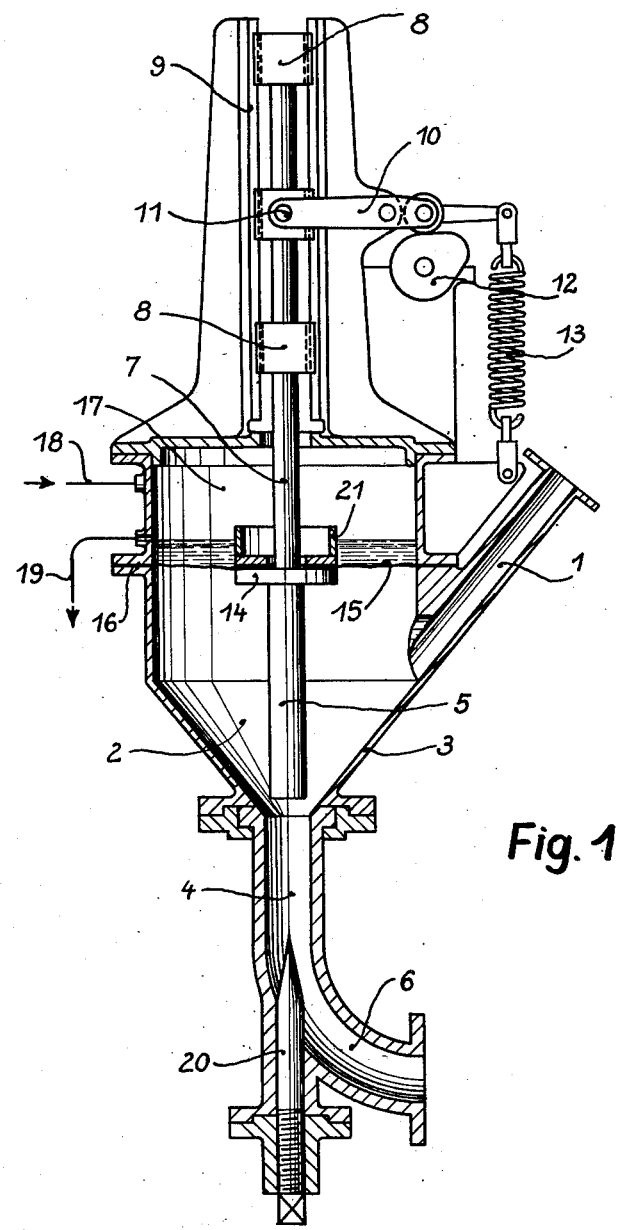

United States Patent Office 2,788,133
Patented Apr. 9, 1957

2,788,133

INTRODUCTION AND REMOVAL OF GRANULAR SOLID MATERIALS INTO OR FROM CLOSED CHAMBERS AT INCREASED PRESSURE

Joseph Daniels, Essen, Germany, assignor, by mesne assignments, to Koppers Company, Inc., Pittsburgh, Pa., a corporation of Delaware Application June 12, 1952, Serial No. 293,134

9 Claims. (Cl. 214—17)

My prior patent application Serial No. 195,732 filed on November 15, 1950, relates to a process and apparatus for moving and transporting respectively bulk goods, particularly finely granular material between chambers at different pressures, without any substantial movement of gas being able to take place from one chamber to the other. The problem of conveying bulk goods in this way exists for example where fine dusts are separated, e. g. in a cyclone, from a gas stream which may be under normal, reduced, or increased pressure, and the separated bulk material has to be removed continuously or in stages from the separating chamber and supplied for some other purpose.

According to the aforesaid application Serial No. 195,732 piston or worm presses are used to move the bulk material, the sealing between the moving and externally driven parts and the fixed housing wall being effected by stuffing boxes.

The present invention solves the problem of moving bulk goods between chambers which are at different gas pressures, without a substantial flow of gas from one chamber to the other, which is at an elevated temperature, such as more than 300°, so that normal stuffing boxes can no longer be provided for sealing the joints for movement and still less so bearings or guides of the normal kind for the actual conveying elements.

According to the invention there is provided for this purpose, between the operating member effecting the advancement or conveyance of the bulk goods and the drive of the same, a temperature barrier arranged so that the operating member coming into direct contact with bulk goods can receive a high temperature without however being able to transfer this temperature to the sealing or guiding and bearing means.

The invention may for example be carried into effect with piston pressure type conveyor members by providing, for the gastight closure of the reciprocating conveyor piston from the fixed housing wall a temperature insensitive elastic diaphragm, for instance in the shape of a plane or arched thin disc or a corrugated hose or other tubular and extensible structure. This diaphragm or other closure means may if required consist of a non-metallic material insensitive to high temperature, for example rubber or synthetic rubber, or inorganic materials such as the tetrafluor-ethylene type, or of thin walled metal members. If, in addition, the reciprocating transport piston is arranged vertically and the operating member is arranged below the closure diaphragm it is possible to supply the top of the closure diaphragm or the like with a cooling fluid.

Where a worm or the like is provided as the conveyor member the temperature barrier is in the form of a cooled arrangement like a stuffing box and if required, or in addition thereto the body of the rear part of the conveyor worm is so constructed that the heat acting on the worm part is conducted through the metal cross section and transmitted to cooling ribs or the like which are arranged between the worm and its driving means, so that the latter can operate at normal temperature.

In the drawing there is shown in

Fig. 1 the invention applied to a piston pressure-like conveying device and in

Figure 2:
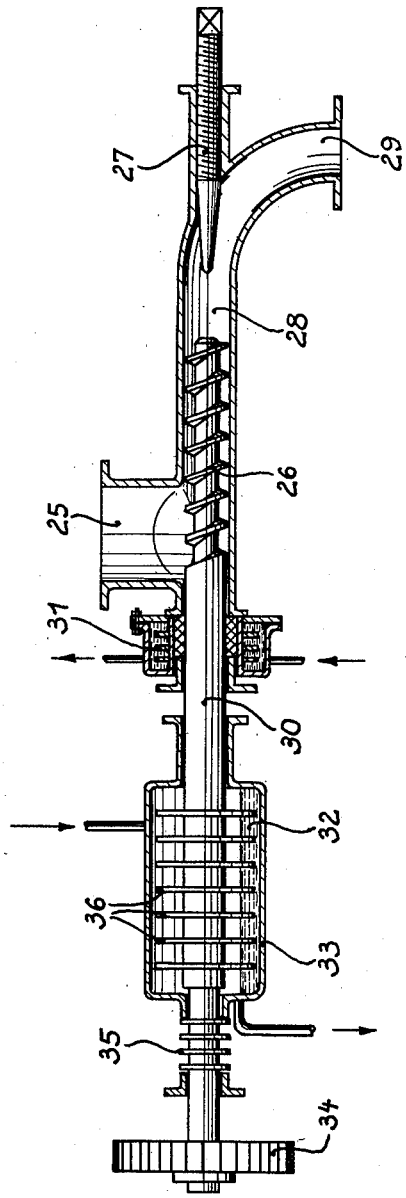

Fig. 2 the invention applied to a conveying device constructed in the manner of a worm press.

In the device according to Fig. 1 the bulk material to be conveyed passes through the branch pipes into a hopper like chamber 2 which is formed by the fixed housing 3. At the base of the hopper 3 there is provided the outlet opening 4 in which the conveyer plunger 5 engages upon downward movement, with a corresponding forward thrust of the bulk material into the passage 4 and the adjoining outlet branch 6.

The working piston 5 is carried by a piston rod 7 whose collar 8 or the like is carried so as to be vertically movable in the guide 9. In order to drive and effect upward and downward movement of the piston rod 7 there is provided a lever 10 which engages the piston rod at 11 and is pivoted anticlockwise by a rotating eccentric 12, a return spring 13 effecting the upward movement of the piston rod 7.

The working piston 5 has at the top a collar 14 to which is fixed an elastic diaphragm 15 consisting e. g. of synthetic rubber and which, as indicated at 16 is clamped between the upper and lower part of the housing 3. In the chamber 17 above the diaphragm 15 a cooling liquid e. g. water can be introduced. The outlet for the cooling water is indicated at 19.

Through the downward movement of the piston 5 bulk material is forced from the hopper chamber 2 into a conveyer passage 4 and moved downwardly in this in accordance with the stroke of the working piston 5. By means of an adjustable obstruction, made for example in the form of a conical pin 20, at the outlet of the passage 4 such a compression of the bulk material in the passage 4 can be obtained that the passage of gases from the chamber 2 in the outlet branch 6 is prevented.

After the working piston 5 has reached its lower end position, it returns and leaves the upper end of the passage 4 substantially free, so that a further quantity of the bulk material can pass from the hopper chamber 2 into the passage 4. In the following downward movement of the piston 5 the material is again compressed in the passage 4 and the previously compressed part is forced into the outlet branch 6 whilst the newly introduced quantity of bulk material then takes over the gastight sealing of the passage 4.

In order to clamp the diaphragm 15 in the collar 14 of the piston 5 there is advantageously provided a cup like body 21 which is preferably made of metal so that it can readily transfer the heat from the piston 5 to the cooling liquid in the chamber 17.

In the apparatus according to Fig. 2, in order to advance and convey the bulk material which enters through the branch pipe 25 there is provided a conveyer worm 26 which cooperates with an obstruction 27. The compression of the material here takes place continually in the chamber 28 and in the threads of the compressing worm 26. The discharged material finally passes out through the branch pipe 29.

The compressor worm 26 floats on the shaft 30 which is arranged in a cooled bearing 31. At the rear part the shaft 30 has a series of metal discs or the like, which slide on to the body thereof and which come into contact with the cooling liquid 32 in the bath 33, and which conduct away heat transmitted through the relatively thick shaft 30 so that the drive 34 is free from abnormal stresses. In addition a coupling 35 which is a bad conductor of heat may be provided.

I claim:

1. Apparatus for moving hot granular solid material between chambers maintained at different pressures comprising a passageway having a material inlet and a material outlet, means for moving said hot granular solid material through said passageway from said inlet to said outlet, said means comprising an operating member positioned without said passageway and a compressive member positioned within said passageway, and a temperature barrier located externally of said passageway in fluid-tight relationship therewith intermediate said operating member and said compressive member, said temperature barrier being adapted to absorb the heat transmitted from said hot granular solid material to said compressive member.

2. The apparatus of claim 1 including an obstruction member positioned within said passageway adjacent the material outlet of said passageway.

3. The apparatus of claim 2 in which said obstruction member comprises a conical pin.

4. The apparatus of claim 2 in which the obstruction member is adjustable.

5. The apparatus of claim 2 in which the compressive member comprises a reciprocating piston.

6. The apparatus of claim 5 in which the temperature barrier comprises an extensible body which forms a portion of the wall of said passageway.

7. The apparatus of claim 2 in which the compressive member comprises a worm press.

8. The apparatus of claim 7 in which said compressive member and said operating member are connected by a shaft and in which said temperature barrier comprises a cooled stuffing box containing a portion of said shaft.

9. The apparatus of claim 8 in which said portion of said shaft contained in said cooled stuffing box is provided with cooling fins.

References Cited in the file of this patent
UNITED STATES PATENTS

| | | |
|---|---|---|
| 871,202 | Bulley | Nov. 19, 1907 |
| 1,533,191 | Kaiser et al. | Apr. 14, 1925 |
| 2,525,973 | Sundstrom et al. | Oct. 17, 1950 |